United States Patent Office 3,746,648
Patented July 17, 1973

3,746,648
STABILIZER COMPOSITION
Lawrence Peoples, Bay City, Mich., assignor to The Dow Chemical Company, Midland, Mich.
No Drawing. Continuation-in-part of abandoned application Ser. No. 832,865, June 12, 1969. This application Mar. 22, 1971, Ser. No. 126,909
Int. Cl. C11d 7/52
U.S. Cl. 252—171                                                     4 Claims

ABSTRACT OF THE DISCLOSURE 1,1,1-trichloroethane can be stabilized at temperatures up to about 100° F. in the presence of aluminum and its alloys by incorporating thereinto at least (a) 4 weight percent of dimethoxymethane (DMM) alone or as a mixture of from 100 to 62 percent DMM and 0 to 38 percent tertiary butyl alcohol (TBA), (b) at least 0.5 weight percent of butylene oxide (BO) or propylene oxide (PO) or a mixture thereof, and (c) 0.25 volume percent (0.20 weight percent) of secondary butyl alcohol (SBA).

The above composition can be admixed with methylene chloride which may contain production and storage stabilizers, e.g., cyclohexane, 0.025 volume percent based on the methylene chloride, so long as the minimum amount of total inhibitor in the mixture equals at least 4 percent of the DMM or DMM/TBA component based on the mixture of chlorinated solvents, at least 0.5 percent of the BO/PO component based on the mixture, and at least 0.25 volume percent (0.20 weight percent) of the SBA component based on the 1,1,1-trichloroethane present in any mixture.

CROSS-REFERENCE TO RELATED APPLICATION

This application is a continuation-in-part of my copending application Ser. No. 832,865, filed June 12, 1969, now abandoned.

BACKGROUND OF THE INVENTION

Recent advances in aerosol technology include the use of 1,1,1-trichloroethane and/or methylene chloride as vapor pressure depressant and co-solvents for the pressurizing gases and formulation ingredients. The presence of aluminum and aluminum alloys in aerosol filling equipment necessitates the presence of stabilizers, particularly for the 1,1,1-trichloroethane to prevent attack upon the aluminum and degradation of the 1,1,1-trichloroethane. The commercial stabilizers used today in 1,1,1-trichloroethane have been found objectionable because of odor and/or reaction with aerosol formulation ingredients resulting in depletion of the stabilizers as well as formation of odors. Therefore, it has been necessary to find new stabilizers which do not have objectionable odors, do not react with formulation ingredients, and are capable of stabilizing 1,1,1-trichloroethane against degradation in the presence of aluminum and the concomitant attack of the aluminum.

BRIEF DESCRIPTION OF INVENTION

It has now been found that 1,1,1-trichloroethane can be stabilized in the presence of aluminum and aluminum alloys at temperatures up to about 100° F. by admixing with the 1,1,1-trichloroethane (a) at least 4 weight percent, based on the 1,1,1-trichloroethane, of dimethoxyethane alone or as a mixture consisting of 100 to 62 weight percent dimethoxymethane, and 0 to 38 weight percent tertiary butyl alcohol, based on the combined ingredients of (a), (b) at least 0.5 weight percent based on the 1,1,1-trichloroethane of butylene oxide, propylene oxide or a mixture thereof, and (c) at least 0.25 volume percent of secondary butyl alcohol based on the 1,1,1-trichloroethane. Further, it has been found that 1,1,1-trichloroethane in admixture with methylene chloride (containing commercial production and storage stabilizers, e.g., 0.025 volume percent cyclohexane) can be stabilized against degradation in the presence of aluminum and aluminum alloys at temperatures up to about 100° F. by incorporating (a) at least a total of 4 weight percent (based on the total weight of the combined chlorinated solvents) of a dimethoxyethane or in a mixture consisting of 62 to 100 weight percent dimethoxymethane, based on the mixture of these stabilizing ingredients and 38 to 0 weight percent of tertiary butyl alcohol, (b) at least 0.5 weight percent based on the total composition of butylene oxide, propylene oxide or a mixture, and (c) at least 0.25 volume percent secondary butyl alcohol based on the 1,1,1-trichloroethane in the mixture.

DETAILED DESCRIPTION OF INVENTION

Several experiments were conducted in which 1,1,1-trichloroethane (containing 0.5% by weight butylene oxide and 0.25 volume percent secondary butyl alcohol) or

TABLE 1

| Solvent | Percent wt. | | 1100 Al,[3] 100° F. | 2024 Al,[4] 100° F. |
|---|---|---|---|---|
| | TBA [1] | DMM [2] | | |
| 1,1,1-trichloroethane [5] | 1 | 3 | OK [6] | OK |
| | 0.5 | 3.5 | OK | OK |
| | | 4 | OK | OK |
| | 1.5 | 2.5 | OK | OK |
| 65 wt. percent 1,1,1-trichloroethane, [5] 35 wt. percent methylene chloride.[7] | 1 | 3 | OK | |
| | 0.5 | 3.5 | OK | OK |
| | | 4.0 | OK | OK |
| | 1.5 | 2.5 | OK | OK |
| 50 wt. percent 1,1,1-trichloroethane,[5] 50 wt. percent methylene chloride.[7] | 1 | 3 | OK | OK |
| | 0.5 | 3.5 | OK | OK |
| | 0 | 4.0 | OK | OK |
| | 1.5 | 2.5 | OK | OK |
| 35 wt. percent 1,1,1-trichloroethane,[5] 65 wt. percent methylene chloride.[7] | 1 | 3 | OK | OK |
| | 0.5 | 3.5 | OK | OK |
| | 0 | 4.0 | OK | OK |

[1] TBA = Tertiary butyl alcohol.
[2] DMM = Dimethoxymethane.
[3] 1100 Al = Pure aluminum.
[4] 2024 Al = An alloy commonly used by industry.
[5] Contains 0.5% by weight butylene oxide and 0.25% by volume secondary butyl alcohol.
[6] OK = No reaction.
[7] Contains 5,000 p.p.m. propylene oxide and 0.025 volume percent cyclohexane.

mixtures of 1,1,1-trichloroethane (containing 0.5% by weight butylene oxide and 0.25% by volume secondary butyl alcohol) and methylene chloride (which contains 5,000 p.p.m. propylene oxide and 0.025 volume percent cyclohexane) were heated to 100° F. or 120° F. and a heated (100° or 120° F.) aluminum (1100 Al) or aluminum alloy (2024 Al) strip (2½ x ½ x 1/16 inches) was placed in the test solvent and scratched several times with a sharp awl. As indicated in the table, several concentrations of the inhibitors of the present invention were added to similarly prepared 1,1,1-trichloroethane and mixtures with methylene chloride to determine the extent of the protection afforded by these inhibitors at 100° F. The results of these experiments are set forth in Table I.

Several additional tests were run at 120° F. to determine whether the inhibitor system of the present invention was effective at this higher temperature. As noted in Table II, which records the results of this series of tests, employing various ratios of t. butyl alcohol and dimethoxymethane as well as lesser amounts of combinations of these materials in tests which were similar in all respects to those above except as noted. The results are tabulated in Table III below.

TABLE III

| Solvent | t. Butyl alcohol | Dimethoxy methane | 1100 Al 100° F. | 1100 Al 120° F. | 2024 Al 100° F. | 2024 Al 120° F. |
|---|---|---|---|---|---|---|
| For comparative purposes | | | | | | |
| 1,1,1-trichloroethane [1] | | 3 | R | R | R | R |
| | | 3 | | | R | R |
| | 0.75 | 2.25 | | | SR [2] | |
| | 1 | 2 | | | R | |
| | | 4 | R | R | R | R |
| | 1.5 | 2.5 | R | R | R | R |
| | 2 | 2 | | | SR | |
| | 3 | 1 | R | R | R | R |
| 65 wt. percent 1,1,1-trichloroethane,[1] 35 wt. percent methylene chloride.[3] | | 3 | R | R | R | R |
| | | 3 | | | SR | SR |
| | 1 | 2 | | | SR | SR |
| | 2 | 2 | | | SR | |
| | 0.75 | 2.25 | | | SR | |
| | | 4 | R | R | R | R |
| | 3 | 1 | R | R | R | R |

[1] Contains 0.5% weight butylene oxide and 0.25% by volume secondary butyl alcohol.
[2] SR=Slight reaction partially healed within 15 minutes.
[3] Contains 5,000 p.p.m. propylene oxide and 0.025% by volume cyclohexane.

TABLE II

| Solvent | TBA [1] | DMM [2] | 1100 Al,[3] 120° F. | 2024 Al,[4] 120° F. |
|---|---|---|---|---|
| 1,1,1-trichloroethane [5] | 1 | 3 | OK [6] | OK |
| | 0.5 | 3.5 | OK | R [8] |
| | | 4 | R | R |
| 65 wt. percent 1,1,1-trichloroethane,[5] 35 wt. percent methylene chloride.[7] | 1.5 | 2.5 | R | OK |
| | 1 | 3 | R | OK |
| | 0.5 | 3.5 | OK | OK |
| | | 4.0 | OK | OK |
| 50 wt. percent 1,1,1-trichloroethane,[5] 50 wt. percent methylene chloride.[7] | 1.5 | 2.5 | OK | OK |
| | 1 | 3 | OK | OK |
| | 0.5 | 3.5 | OK | OK |
| | 0 | 4.0 | OK | OK |
| 35 wt. percent 1,1,1-trichloroethane,[5] 65 wt. percent methylene chloride.[7] | 1.5 | 2.5 | OK | OK |
| | 1 | 3 | OK | OK |
| | 0.5 | 3.5 | OK | OK |
| | 0 | 4.0 | OK | OK |

[1] TBA=Tertiary butyl alcohol.
[2] DMM=Dimethoxymethane.
[3] 1100 Al=Pure aluminum.
[4] 2024 Al=An alloy commonly used by industry.
[5] Contains 0.5% by weight butylene oxide and 0.25% by volume secondary butyl alcohol.
[6] OK=No reaction.
[7] Contains 5,000 p.p.m. propylene oxide and 0.025 volume percent cyclohexane.
[8] R=Reaction occurred within 15 minutes which did not heal.

1,1,1-trichloroethane alone is not satisfactorily stabilized against attack on aluminum when the tertiary butyl alcohol (TBA) is left out and the dimethoxymethane (DMM) is at the 4% level or when the TBA is at 0.5% and DMM is at 3.5% level against 2024 Al.

Similarly, the mixture of 65% 1,1,1-trichloroethane with 35% methylene chloride is not stabilized against 1100 Al at 120° F. if the DMM is 3.0% or less. Since in most industrial usage the possibility exists for mixing the 1,1,1-trichloroethane with methylene chloride, the inhibitor is not recommended for usage at temperatures of 120° F. even though the 50–50 and 35–65 mixtures are satisfactorily stabilized.

For purposes of comparison, several tests were run

I claim:
1. A composition of matter stable to at least 100° F. consisting essentially of
   (a) 93.5 to 96.9 weight percent of a member selected from the group consisting of 1,1,1-trichloroethane and 1,1,1-trichloroethane in admixture with methylene chloride containing 0.025 volume percent cyclohexane based on the methylene chloride,
   (b) 2.5 to 4 weight percent dimethoxymethane,
   (c) 0 to 1.5 weight percent tertiary butyl alcohol,
   (d) 0.5 to 1 weight percent of a member selected from the group consisting of butylene oxide, propylene oxide, and mixtures thereof, and
   (e) 0.25 volume percent (0.20 weight percent) secondary butyl alcohol based on the 1,1,1-trichloroethane present.

2. The composition of claim 1 wherein the 1,1,1-trichloroethane is present in an amount of about 65 percent and the methylene chloride is present in an amount of about 35 percent and said dimethoxymethane is present in at least 3.0 percent by weight.

3. The composition of claim 1 wherein the 1,1,1-trichloroethane is present in an amount of about 50 percent and the methylene chloride is present in an amount of about 50 percent and said dimethoxymethane is present in at least 2.5 percent by weight.

4. The composition of claim 1 wherein the 1,1,1-trichloroethane is present in an amount of about 35 percent and the methylene chloride is present in an amount of about 65 percent.

References Cited

UNITED STATES PATENTS

| | | | |
|---|---|---|---|
| 3,128,315 | 4/1964 | Hardies | 252—171 |
| 3,281,480 | 10/1966 | Hardies | 252—171 |
| 3,326,988 | 6/1967 | Stack | 252—171 |
| 3,535,392 | 10/1970 | Cormany et al. | 252—171 |
| 3,646,229 | 2/1972 | Archer et al. | 252—170 |

WILLIAM E. SCHULZ, Primary Examiner

U.S. Cl. X.R.

260—652.5